United States Patent [19]

Takakura et al.

[11] Patent Number: 6,070,111
[45] Date of Patent: May 30, 2000

[54] VEHICLE DIAGNOSING APPARATUS

[75] Inventors: Keiji Takakura, Saitama-ken; Hiroyuki Aiba, Tochigi-ken, both of Japan

[73] Assignee: Honda Giken Kogyo Kabushiki Kaisha, Tokyo, Japan

[21] Appl. No.: 09/025,839

[22] Filed: Feb. 19, 1998

[30] Foreign Application Priority Data

Apr. 9, 1997 [JP] Japan .................................. 9-090695

[51] Int. Cl.⁷ ................................................. G01M 17/00
[52] U.S. Cl. ................................................. 701/29; 701/34
[58] Field of Search ................................. 701/29, 31, 33, 701/34, 35; 73/116, 117.2, 117.3

[56] References Cited

U.S. PATENT DOCUMENTS

| | | | |
|---|---|---|---|
| 4,402,217 | 9/1983 | Higashiyama | 73/117.3 |
| 4,534,214 | 8/1985 | Takahashi | 73/118.1 |
| 5,063,515 | 11/1991 | Kunst et al. | 364/431.01 |
| 5,418,719 | 5/1995 | Abe et al. | 364/424.03 |
| 5,488,938 | 2/1996 | Ohuchi | 123/571 |
| 5,503,009 | 4/1996 | Angermeier et al. | 73/117.3 |
| 5,616,837 | 4/1997 | Leonard et al. | 73/119 A |
| 5,663,493 | 9/1997 | Gerbert et al. | 340/439 |
| 5,680,311 | 10/1997 | Trsar et al. | 701/101 |

FOREIGN PATENT DOCUMENTS

| | | |
|---|---|---|
| 0 831 222 A2 | 3/1998 | European Pat. Off. . |
| 3-276019 | 12/1991 | Japan . |
| 7-15429 | 2/1995 | Japan . |
| 7-18779 | 3/1995 | Japan . |
| 7-18780 | 3/1995 | Japan . |
| 7-76728 | 8/1995 | Japan . |

Primary Examiner—William A. Cuchlinski, Jr.
Assistant Examiner—Edward Pipala
Attorney, Agent, or Firm—Armstrong, Westerman, Hattori, McLeland & Naughton

[57] ABSTRACT

In a vehicle diagnosing apparatus having a function of incorporating data from sensors which are disposed in a vehicle, the data from the sensors are continuously incorporated before diagnosing. The state of changes in the data are displayed as a graph. Then, the timings of incorporating the data used for diagnosing are set on the graph.

2 Claims, 2 Drawing Sheets

VEHICLE DIAGNOSING APPARATUS

BACKGROUND OF THE INVENTION

1. Field of the Invention

The present invention relates to a vehicle diagnosing apparatus which diagnoses a vehicle via an electronic control unit (ECU) which is mounted on the vehicle.

2. Description of the Related Art

As this kind of vehicle diagnosing apparatus, there has hitherto been known the following one in Japanese Published Examined Patent Application No. 18780/1995. Namely, the vehicle diagnosing apparatus is connected to an electronic control unit which is mounted on a vehicle, and the vehicle is diagnosed by incorporating (or receiving), via the electronic control unit, detected signals from various sensors which are disposed in the vehicle. When a signal which demands the transmission of data is transmitted from the vehicle diagnosing apparatus to the electronic control unit, the detected signals from the sensors that meet the requirements of the demand are transmitted to the vehicle diagnosing apparatus. The vehicle is then diagnosed based on the detected signals.

There has also been known the following vehicle diagnosing apparatus in Japanese Published Examined Patent Application No. 18779/1995. Namely, for example, the state (or condition) of depressing an accelerator pedal, and an air/fuel ratio which is obtained by a signal detected by an $O_2$ sensor are respectively detected as digitized data. If the air/fuel ratio is switched from a lean state to a rich state by a change in the state of depressing the accelerator pedal from a non-depressed condition to a depressed condition, a judgement is made that the vehicle is in a normal condition.

In the former example of the above-described conventional apparatuses, it is necessary to set in advance, before the vehicle is diagnosed, the timing of transmitting the signal which demands the transmission of data. For example, in case the timing of incorporating the detected signals is set theoretically by making the lapse of time to serve as a parameter, it is necessary to make the setting, by referring to the design data of the vehicle, such that the detected signals can be incorporated surely and stably at timings with sufficient allowance in time. Therefore, it requires unnecessarily long time before the incorporation of the detected signals is completed, with the result that the diagnosing time becomes long. It is conceivable to continuously incorporate the detected signals from various kinds of sensors over a wide range prior to the diagnosing and then to set in advance the most appropriate timings of incorporating the detected signals from the state of changes in the detected signals. However, this solution requires a separate apparatus for the purpose of setting the timings.

In the latter example of the above-described conventional apparatuses, on the other hand, since the diagnosing is performed by means of digitized data, a judgement cannot be made about the timing at which the digitized data are switched. It follows that an accurate diagnosing cannot be performed. In other words, for example, even if the air/fuel ratio is judged to have been switched to the rich state by depression of the accelerator pedal, the vehicle cannot surely be judged to be normal unless there is known the timing at which the lean state is switched to the rich state.

Therefore, in view of the above-described problems, the present invention has an object of providing a vehicle diagnosing apparatus in which the detected signals can be incorporated at most appropriate timings without using a separate apparatus and in which a more accurate diagnosing than the diagnosing by means of digitized data can be performed.

SUMMARY OF THE INVENTION

In order to attain the above and other objects, according to a first aspect of the present invention, there is provided a vehicle diagnosing apparatus which is connected to an electronic control unit mounted on a vehicle, the apparatus diagnosing the vehicle by incorporating detected signals, via the electronic control unit, from various sensors which are disposed in the vehicle. The apparatus comprises: means for continuously receiving the detected signals before starting the diagnosing; means for displaying a state of changes in the detected signals as a graph; and a function for setting, on the graphically displayed state, timings of incorporating the detected signals used for diagnosing.

According to a second aspect of the present invention, there is provided a vehicle diagnosing apparatus for diagnosing a vehicle comprising: means for incorporating detected signals from a sensor for detecting an operation amount of an operating portion of the vehicle and from a sensor for detecting an amount of change in state of an operated portion, the state of operated portion being changed by an operation of the operating portion; and means for diagnosing an interlocking relationship between the operating portion and the operated portion, the diagnosing being made from the detected signal of one of the sensors at a point of time when the detected signal of the other of the sensors satisfies a predetermined condition.

The timings for incorporating the detected signals shall preferably be set not theoretically but on the basis of the state of changes in the actually detected signals, because the time for diagnosing can thereby be shortened. However, if a separate apparatus is required for setting the timing, it takes time and expense for the setting. On the other hand, the diagnosing apparatus is provided with a function for incorporating the detected signals. Therefore, according to the first aspect of the present invention, the following arrangement has been made. Namely, the diagnosing apparatus itself is provided with a function for setting the timings, and the detected signals are incorporated over a wide range before starting the diagnosing. Then, from the state of changes in the detected signals that have been incorporated, there is set a most appropriate timing for incorporating the detected signals used for diagnosing.

Further, suppose that the accelerator pedal is defined to be the operating portion, changes will occur to such states as an air/fuel ratio and the rotational frequency of the engine which is defined to be the operated portion. Therefore, according to the second aspect of the present invention, the diagnosing of the vehicle is made not by whether the accelerator pedal is depressed or not but by detecting to what degree the accelerator pedal has been depressed.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
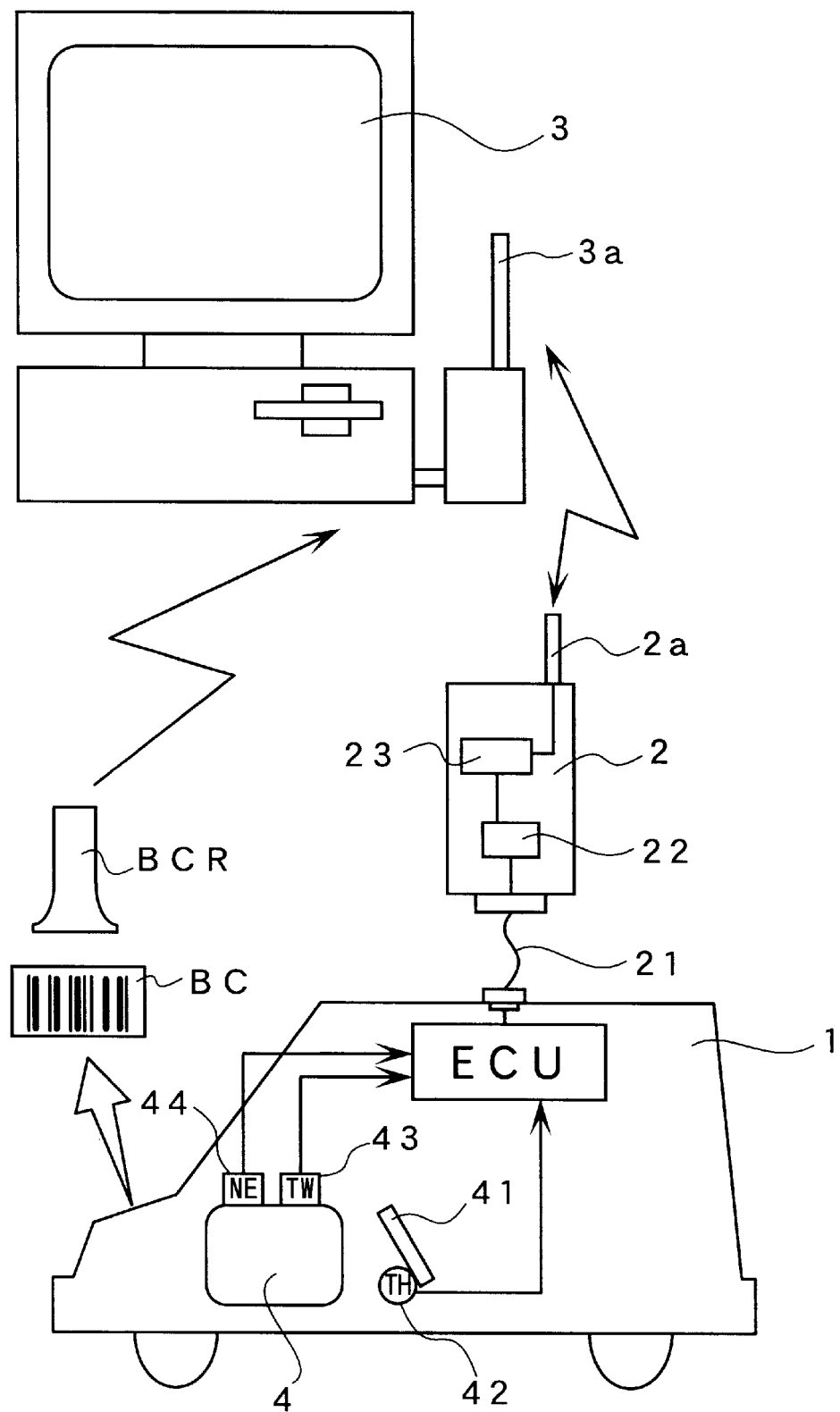
FIG. 1 is a schematic diagram to show the arrangement of one example of the present invention.

With reference to FIG. 1, reference numeral 1 denotes a vehicle on which an electronic control unit (ECU) is mounted. Reference numeral 2 denotes a portable diagnosing unit which is connected via a cable 21 to the electronic control unit on the vehicle 1. The vehicle 1 has indicated thereon a vehicle number which is peculiar to each vehicle in the form of a bar code BC. The bar code BC is read by a bar code reader BCR. In the vicinity of the vehicle 1, there is disposed a host computer 3. Bidirectional wireless communication is performed between the diagnosing unit 2 and the host computer 3. This bidirectional wireless communication between the diagnosing unit 2 and the host computer 3 is performed by means of an antenna 2a which is provided in the diagnosing unit 2 and an antenna 3a which is connected to the host computer 3.

The diagnosing unit 2 contains therein a data buffer 22 which temporarily stores the detected signals read from the electronic control unit and various data, and a communication portion (or module) 23 which transmits to the host computer 3 the detected signals or the like stored in the data buffer 22. Upon receipt of the data from the diagnosing unit 2, the host computer 3 analyzes the data to judge whether the vehicle is normal or not. The results of diagnosing are recorded together with the other data such as the vehicle number or the like.

Figure 2:
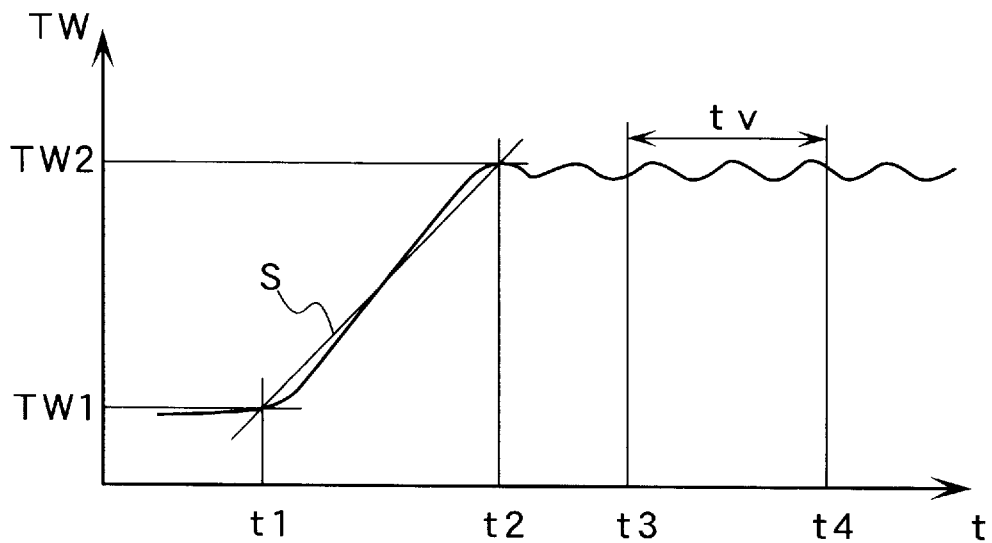
FIG. 2 is a graph to show one example of a display for setting the timing of incorporating the data.

The vehicle 1 has mounted thereon an engine 4 and is provided with the following sensors, i.e., a throttle sensor 42 which detects a throttle opening TH from the amount of depression of an accelerator pedal 41, a water temperature sensor 43 which detects the temperature of the engine cooling water TW, and a rotational frequency sensor 44 which detects the rotational frequency (or rotational speed) of the engine NE. These various sensors 42, 43, 44 are connected to the electronic control unit, and the defected signals from each of these sensors 42, 43, 44 are outputted from the electronic control unit to the diagnosing unit 2. When the host computer 3 incorporates the detected signals required for diagnosing, a signal which demands the transmission of data is transmitted to the electronic control unit via the diagnosing unit 2, and the detected signals of the required sensors are incorporated as the data. Therefore, before starting the diagnosing, it is necessary to set the timing for incorporating the detected signals as the data. For example, as shown in FIG. 2, the detected signal from the cooling water temperature sensor 43 increases, after the engine 4 has started, from TW1 up to TW2 at an inclination of S and is, thereafter, maintained at a constant value by the operation of a radiator. In order to perform the diagnosing, the inclination S and an average value of TW in a predetermined period of time tv are obtained. Diagnosing is performed by seeing whether both fall within normal ranges which are set in advance. First, in order to obtain the inclination S, it is necessary to set the timing of incorporating TW1 and TW2. The host computer 3 has a timing setting function for setting the timing of incorporating TW1 and TW2. Before starting the diagnosing, the engine 4 is operated, and the detected signal from the cooling water temperature sensor 43 is continuously incorporated into the host computer 3, and is displayed in the form of a graph similar to that shown in FIG. 2. By looking at the graph displayed in the host computer 3, the operator sets t1, t2 which are the incorporating timings for obtaining the inclination S and, also, sets t3 and t4 which are the timings for obtaining the average value. Once the timings t1, t2, t3 and t4 have been set as described above, the host computer 3 transmits to the diagnosing unit 2 the signal which demands the transmission of data at the time of diagnosing at these set timings. Then, from the values TW1, TW2 of TW that are incorporated at the timings of t1 and t2, the inclination S is obtained by (TW2−TW1)/(t2−t1). Further, there is obtained an average value of the values TW that are incorporated between the timings t3 and t4.

Figure 3:
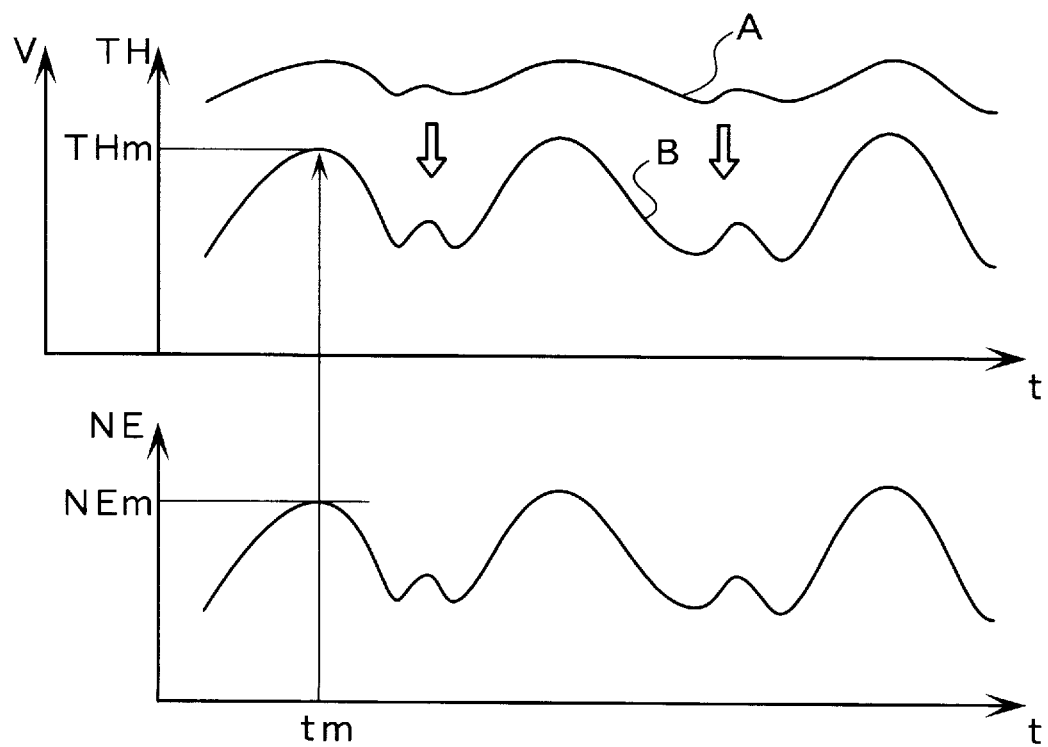
FIG. 3 is a graph to show the relationship between the rotational frequency NE of the engine and the throttle opening TH.

An explanation will hereinafter be made about an example in which diagnosing is made of the relationship between the amount of depression of the accelerator pedal 41 which is defined to be an operating portion, and the rotational frequency NE of the engine 4 which is defined to be an operated portion. With reference to FIG. 3, the detected signal from the throttle sensor 42 is outputted as a change in voltage V as shown by a curve A. In order for the output to correspond to the rotational frequency NE of the engine 4, the detected signal A is multiplied by a function to thereby convert it to the throttle opening TH as shown by a curve B. On the other hand, the rotational frequency NE from the rotational frequency sensor 44 is also incorporated. Then, a relative maximum value NEm of the rotational frequency NE is obtained, and there is obtained the throttle opening value THm which corresponds to the point of time tm at which the rotational frequency NE becomes the relative maximum value NEm. The diagnosis is made by judging whether the throttle opening value THm falls within a predetermined range which has been set in advance.

As can be seen from the above-described explanations, according to the present invention, the timings for incorporating the detected signals from various sensors can most appropriately be set without using a separate apparatus. Further, since the diagnosing of the vehicle is performed not by digitized data but by continuous data, the diagnosing can be performed accurately.

It is readily apparent that the above-described vehicle diagnosing apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A vehicle diagnosing apparatus which is connected to an electronic control unit mounted on a vehicle, said apparatus diagnosing the vehicle by incorporating detected signals, via said electronic control unit, from various sensors which are disposed in the vehicle, said apparatus comprising:

means for continuously receiving said detected signals before starting the diagnosing;

means, operably coupled to said continuously receiving means, for displaying a state of changes in the detected signals as a graph; and means, operably coupled to said displaying means, for receiving and for setting, on said displayed graph, timings of incorporating the detected signals used for diagnosing.

2. A vehicle diagnosing apparatus for diagnosing a vehicle comprising:

means for incorporating detected signals from a first sensor for detecting an operation amount of an operating portion of the vehicle and from a second sensor for detecting an amount of change in state of an operated portion, said state of said operated portion being changed by an operation of said operating portion; and means, operably coupled to said incorporating means, for diagnosing an interlocking relationship between said operating portion and said operated portion, said diagnosing being made from the detected signal of one of said first and second sensors at a point of time when the detected signal of the other of said first and second sensors satisfies a predetermined condition, said point of time being set in said diagnosing means.

* * * * *